United States Patent [19]

Michel et al.

[11] 3,939,250

[45] Feb. 17, 1976

[54] METHOD OF TREATING RESIDUAL GASES CONTAINING VARIOUS COMPOUNDS OF SULPHUR

[75] Inventors: Max Michel, Yerres; Georges Dupuy, Fontenay-aux-Roses, both of France

[73] Assignee: Rhone-Poulenc Industries, Courbevoie, France

[22] Filed: June 25, 1973

[21] Appl. No.: 372,985

[30] Foreign Application Priority Data

June 29, 1972 France.............................. 72.23497

[52] U.S. Cl. ................ 423/224; 423/230; 423/244; 423/576; 423/574 R; 423/576
[51] Int. Cl.² ......................................... B01D 53/34
[58] Field of Search ........... 423/224, 230, 244, 571, 423/574, 576

[56] References Cited
UNITED STATES PATENTS
3,717,699  2/1973  Nicklin et al. ...................... 423/576
3,725,531  4/1973  Pearson et al. .................. 423/576 X
3,798,315  3/1974  Nicklin .............................. 423/574

Primary Examiner—Earl C. Thomas
Attorney, Agent, or Firm—McDougall, Hersh & Scott

[57] ABSTRACT

This invention is addressed to a method of catalytic treatment of residual gases containing various compounds of sulphur, particularly hydrolyzable compounds of sulphur by the Claus reaction.

These residual gases, at the expense of which all or part of the necessary amount of sulphurous anhydride is formed, are treated at temperatures above 200°C in the presence of catalysts comprising active alumina and one or more oxides, sulphides or compounds capable of being sulphurized, of molybdenum, cobalt, nickel, iron and uranium.

4 Claims, No Drawings

METHOD OF TREATING RESIDUAL GASES CONTAINING VARIOUS COMPOUNDS OF SULPHUR

This invention relates to the catalytic treatment of residual gases containing various gaseous compounds of sulphur.

It is known that gaseous mixtures of complex composition, which are charged with sulphur compounds, such as the gaseous mixtures resulting from the purification of gaseous or liquid natural hydrocarbons, are frequently encountered in the chemical industry. By purification of such gaseous mixtures, it is possible to recover substantial amounts of sulphur. Known methods for recovering sulphur must, however, be constantly improved in order that the content of sulphur compounds in the purified gaseous mixture be reduced to as low a level as possible before discharge into the atmosphere, in view of the increasingly severe standards which are being established on pollution.

In the most widespread case, the greatest part of the sulphur contained in the gaseous mixture is in the form of hydrogen sulphide. The recovery of this sulphur is based generally on the well known Claus reaction, which can be effected in a gaseous or liquid medium, between the sulphurous anhydride resulting from the oxidation of a suitable fraction of the hydrogen sulphide and the remaining amount of hydrogen sulphide.

The Claus reaction which is in equilibrium is desirably carried out at the lowest temperature possible in order to promote the obtaining of sulphur. It can be effected at ordinary temperature provided that it is activated by means of suitable catalysts.

In industrial practice, the treatment of gaseous mixtures having a high hydrogen sulphide content is often effected by stages in the gaseous phase. A substantial fraction of the sulphur is obtained at first simply by partial cooling of the gaseous mixtures which are raised to a temperature of about 1000°C and partially oxidized by the injection of air, so as to obtain the desired amount of sulphurous anhydride. The gases are then treated in a series of catalytic stages which are interposed with condensers. In the catalytic stages, to prevent sulphur from being deposited on the catalyst, the temperatures, while being lower than those of the first thermal stage, are maintained above the dew points of the sulphur, corresponding to the various sulphur contents of the gases in the catalytic stages. Only the last stage, which must be provided to recover to the maximum extent the last traces of sulphur, operates by means of catalysts which are highly active at low temperatures, such as a little higher than 100°C, in order for the water produced to escape as vapor. The sulphur which is then deposited on the catalysts will be desorbed by vaporization or combustion.

Very frequently, the efficiency of the installations for purifying industrial gaseous mixtures and for recovering sulphur decreases in time and an increasing proportion of gaseous compounds of sulphur is discharged into the atmosphere, unless the installations are highly oversized from the capacity standpoint.

This loss in efficiency is probably related to sulphating of the catalysts, which often comprise active alumina used in the first purification stages. This sulphating is usually progressive and results from the presence of traces of oxygen in the gases to be treated, but its origin can also be due to air to which the catalyst is inadvertently exposed while incompletely cooled during shutdown of the installation.

It seems that such sulphating not only reduces the efficiency of the Claus reaction, but also the reactions for the destruction by hydrolysis of the other gaseous compounds of sulphur which are present. These other sulphur compounds are carbon-bearing compounds, such as carbon disulphide and carbonyl sulphide, the hydrolysis of which gives hydrogen sulphide which adds to the hydrogen normally present in the gaseous mixtures, and is likewise converted into sulphur. These other gaseous compounds, simply by being present, inhibit the Claus reaction in the successive catalytic stages. This contributes to increasing the sulphur content in the purified gases, the sulphur then being present in the form of hydrogen sulphide and in the form of these other non-hydrolyzed gaseous compounds.

Although it is possible to reduce the disadvantages resulting from the abovementioned sulphating, by adding ammonia or similar compounds to the gas, this practice suffers from a number of disadvantages. It is preferable to make use of catalysts which retain a sufficient amount of activity over extended periods of time with respect to the Claus reaction and the reactions for hydrolyzing the other gaseous compounds. Such catalysts make it possible, at any time, completely to destroy the other gaseous sulphur compounds in the first stages of the installation, and this protects the final low temperature purification stage. In order to retain the maximum amount of the last traces of hydrogen sulphide, it is then possible, in the last stage, to make use of highly effective catalysts which often also comprise active alumina having a high specific area, but which are particularly sensitive to the presence of the abovementioned gaseous sulphur compounds. The efficiency of active alumina as a Claus reaction catalyst is well known and this substance, in various forms in fixed, moving, fluid or flying beds, can be used in all the catalytic stages of the sulphur recovery units.

As an object of this invention, a method has now been perfected for the catalytic treatment, at temperatures higher than 200°C, of residual gases which have a high hydrogen sulphide content and which possibly contain gaseous derivatives of sulphur, such as carbon disulphide and carbonyl sulphide, the efficiency of which does not deteriorate in time. This method comprises passing said residual gases, containing the sulphurous gas necessary for the Claus reaction (said sulphurous gas coming from the partial oxidation of said gases and/or an addition) over catalysts comprising a carrier formed of active alumina having a large specific surface area and oxides, sulphides or compounds capable of being sulphurized, preferably in the course of operation of the method, of one or more of the metals selected from the group comprising molybdenum, cobalt, nickel, iron and uranium. Suitable active aluminas have a specific surface area $\geq 150$ m$^2$/g and a pore volume $\geq 0.2$ cm$^3$/g. The amount by weight of the metals in the form of their oxides, sulphides or other compounds, necessary for insuring stability of activity in time, can vary with respect to the alumina to an amount within the range of 1–15% and preferably 2–8% of the alumina.

Under these conditions, the catalysts have a high degree of activity. It has been found that even when they have been inadvertently highly sulphated, they substantially retain their initial activity when they are brought into contact with gases of the usual compositions and the temperatures of the first stages of the purification unit. It is believed that the fixing of the radical $SO_4$ on these catalysts is much less tenacious than on the active alumina.

The catalysts used in the method of this invention can be prepared in various known ways. However, a general procedure, which is particularly suitable, comprises impregnating the active alumina carriers with solutions of the metal compounds capable of readily yielding the corresponding oxides by thermal decomposition. The concentration of the solution is selected so as to provide the desired amount of catalytic metal in the finished catalyst. The preferred solutions are often in the form of the nitrates of the metals. However, other compounds can be used, such as organic salts, for example the acetates, salts in which metals are present in the acid radicals, and metal complexes. The catalysts, which are prepared in this manner, are believed to be progressively sulphurized during use thereof; however, it may be desirable to sulphurize them before use, as by means of gaseous streams of suitable composition.

In order clearly to illustrate the merits of the catalysts used in the practice of this invention, which can be used in fixed or in fluid beds, various examples are given by way of illustration, but not by way of limitation, including the results of comparative tests in a fixed bed, in which the most important parameters are varied.

EXAMPLE 1

This comparative example is intended solely to show the part played by sulphating of various catalysts. In order to reproduce rates of sulphating which are similar to those which can be attained in industrial units after several years of operation, these various catalysts are treated at atmospheric pressure for a period of 4 hours at a temperature of 450°C, with air mixed with 30% by volume of sulphurous anhydride. Under these conditions, the proportion of radicals $SO_4$ fixed is from 7 to 9% of the weight of the catalyst. The various catalysts compared in this example are either active alumina having a specific surface area of 350 m²/g and a pore volume of 0.53 cm³/g in the form of balls having a diameter of 0.6 to 1 mm, or the same alumina impregnated with solutions of nitrates of the metals so as to attain desired oxide contents after drying and calcining at 500°C for 4 hours.

The catalysts containing metals, in order rapidly to be brought substantially into the same condition as encountered during operation thereof, are then sulphurized in a nitrogen stream to which there is added 8% by volume of hydrogen sulphide, at a temperature of 350°C, for a period of 2 hours at atmospheric pressure.

All the tests are carried out by placing 100 cm³ of these various catalysts as well as the same catalysts in the new condition, in a 40 mm diameter reaction tube maintained at a temperature of 350°C and then at 300°C.

The gas flow treated has a flow rate of 1200 cm³/min in order to provide a contact time of 5 seconds (s); it has the following volumetric composition, similar to that of the gases treated in industrial units:

| | |
|---|---|
| $H_2S$ | 8% |
| $SO_2$ | 4% |
| $H_2O$ | 23% |
| $N_2$ | 65% |

The gases issuing from the reaction vessel are analyzed by chromatography to determine the rate $\rho$ $SO_2$ of conversion of the sulphurous anhydride which, in this case, also expresses the sulphur yield of the reaction.

Table 1 hereinafter combines the characteristics of the catalysts used and the results obtained.

TABLE 1

| CATALYSTS N° Composition | | Specific surface area m²/g | Pore volume cm³/g | $\rho SO_2$ % at 350°C | at 300°C |
|---|---|---|---|---|---|
| 1 Active alumina | new | 350 | 0.53 | 72 | 84 |
| | sulphated | 310 | 0.53 | 69 | 75 |
| 2 Active alumina 1 new + 4%Co | new | 275 | 0.49 | 72 | 84 |
| | sulphated | 240 | 0.48 | 72 | 83 |
| 3 Active alumina 1 new + 3%Fe | new | 265 | 0.50 | 71.5 | 83 |
| | sulphated | 250 | 0.50 | 71 | 81 |
| 4 Active alumina 1 new +3.3%Mo | new | 245 | 0.52 | 71 | 82 |
| | sulphated | 240 | 0.51 | 71 | 80 |

It will be seen from the results recorded in the above table that if the rate of $SO_2$ conversion is excellent on new alumina, it diminishes substantially on sulphated alumina, whereas the metal-containing catalysts give a $SO_2$ conversion rate which diminishes relatively much less and which, despite sulphating, remains close to the thermodynamic efficiency at the temperature in question, which is 72% at 350°C and 84% at 300°C.

EXAMPLE 2

This example combines results concerning the treatment of gases whose composition is more complex and which more closely approaches the compositions of gases to be treated in sulphur recovery units, having the following composition by volume:

| | |
|---|---|
| $H_2S$ | 6% |
| $CS_2$ | 1% |
| $SO_2$ | 4% |
| $H_2O$ | 28% |
| $N_2$ | 61% |

The tests are carried out in the same reaction vessel as that used in the preceding example, with gas flow rates corresponding to contact times of 3, 5 and 8 s, the temperatures corresponding to these three contact times being 320°, 335° and 335°C, respectively.

The catalysts tested are catalysts 1, 2 and 4 of the preceding example, in the new and in the sulphated state. Measurements are taken not only of the rate of conversion $\rho SO_2$ but also the rate of hydrolysis $\rho CS_2$ of carbon disulphide.

The results are summarized in the following Table 2:

TABLE 2

| CATALYSTS | Contact time 3s 320°C | | Contact time 5s 335°C | | Contact time 8s 335°C | |
|---|---|---|---|---|---|---|
| | $\rho SO_2$ | $\rho CS_2$ | $\rho SO_2$ | $\rho CS_2$ | $\rho SO_2$ | $\rho CS_2$ |
| 1 new | 77 | 34 | 61 | 78 | 61 | 98.8 |
| sulphated | 78 | 4 | 60 | 25 | 60 | 65 |
| 2 new | 77 | 38 | 60 | 79 | 62 | 100 |
| sulphated | 78 | 15 | 61 | 35 | 60 | 85 |
| 4 new | 78 | 37 | 61 | 80 | 62 | 100 |
| sulphated | 79 | 15 | 61 | 51 | 62 | 93 |

These tests show that the catalysts used in the method of the invention are capable not only of effecting the Claus reaction on the hydrogen sulphide originally present in the gas to be treated, but also effecting the reaction on the hydrogen sulphide resulting from the previous hydrolysis of gaseous carbon derivatives of sulphur, notwithstanding the sulphating rate which occurs, corresponding to that normally occurring in industrial units after several years of operation.

EXAMPLE 3

This example concerns results obtained with sulphated catalysts having different proportions of catalytic metal and using the same active alumina as the carrier, as that of the catalysts in the preceding examples; the metal selected is molybdenum.

The tests are carried out at a temperature of 335°C with the same apparatus as that used in the preceding examples and with the same gaseous mixture as that used in Example 2.

Table 3 hereinafter gives the value obtained of $\rho SO_2$ for their contact time of 5s and the values of $\rho CS_2$ for contact times of 5 and 8s.

TABLE 3

| Catalysts % by weight of molybdenum with respect to the alumina carrier | $\rho SO_2$ | $\rho CS_2$ | |
|---|---|---|---|
| | 5 s | 5 s | 8 s |
| 0 | 60 | 25 | 65 |
| 1.3 | 61 | 50 | 90 |
| 3.3 | 61 | 51 | 93 |
| 6.6 | 61 | 55 | 96 |

These tests show that the efficiency of the metalcontaining catalysts is maintained when these metals are in different proportions. However, the recommended proportions are, dependent on circumstances, from 2% to 8% of the weight of said metals with respect to the alumina.

EXAMPLE 4

This example is intended to show the influence of the specific surface area of the carrier on the results obtained.

The tests are performed at a temperature T of 335°C in the same manner and with a gaseous stream of the same composition as that used in the preceding example.

The catalysts tested are all in the sulphated state and differ only in respect of the characteristics of the active alumina used. They all contain 3.3% by weight of molybdenum as the catalytic metal, with respect to the carrier.

The results obtained are shown in Table 4 below.

TABLE 4

| CHARACTERISTICS OF THE ALUMINA CARRIER Specific surface area and pore volume | $\rho SO_2$ | $\rho CS_2$ | |
|---|---|---|---|
| | 5 s | 5 s | 8 s |
| 80 m²/g 0.50 cm³/g | 35 | 27 | 50 |
| 150 m²/g 0.50 cm³/g | 53 | 44 | 82 |
| 200 m²/g 0.53 cm³/g | 60 | 50 | 93 |
| 350 m²/g 0.53 cm³/g | 61 | 51 | 93 |

This example shows the loss in efficiency with the specific surface area of the carriers, and also shows that only an alumina having an active surface area of at least 150 m²/g, when used as a carrier, gives sufficiently active catalysts.

It will be understood that changes may be made in the details of formulation and operation without departing from the spirit of the invention, especially as defined in the following claims.

We claim:

1. A method of catalytic treatment of residual gases containing carbon disulphide, carbonyl sulphide and having high hydrogen sulphide content comprising the steps of passing the gases in admixture with sulphur dioxide for the Claus reaction at a temperature above 200°C into contact with catalysts consisting essentially of a carrier of active alumina having a specific surface area of at least 150 m²/g, a pore volume of at least 0.2 cm³/g, and a compound selected from the group consisting of the oxides, sulphides and compounds capable of being sulphurized of a metal selected from the group consisting of molybdenum, cobalt, nickel and iron present in an amount within the range of 1–15% by weight of the activated alumina.

2. A method as claimed in claim 1 in which the sulfur dioxide is derived by partial oxidation of the sulphur compounds present in the residual gases.

3. A method as claimed in claim 1 in which the amount of metal compound on the catalyst is within the range of 2–8% by weight of the alumina.

4. A method as claimed in claim 1 in which the catalyst is subjected to a sulphated treatment prior to use.

* * * * *